(12) United States Patent
Budde

(10) Patent No.: US 8,651,788 B1
(45) Date of Patent: Feb. 18, 2014

(54) VARIABLE-LENGTH, ADJUSTABLE SPACER

(75) Inventor: Horst Budde, Burnaby (CA)

(73) Assignee: Horst Budde, Burnaby (CA)

( * ) Notice: Subject to any disclaimer, the term of this patent is extended or adjusted under 35 U.S.C. 154(b) by 0 days.

(21) Appl. No.: 13/605,473

(22) Filed: Sep. 6, 2012

(51) Int. Cl.
*F16B 43/00* (2006.01)

(52) U.S. Cl.
USPC .......................................... 411/535; 411/546

(58) Field of Classification Search
USPC ............... 411/352, 353, 517, 535, 546, 548
See application file for complete search history.

(56) References Cited

U.S. PATENT DOCUMENTS

| | | |
|---|---|---|
| 3,126,935 A | 3/1964 | Tuozzo |
| 4,057,164 A | 11/1977 | Maier |
| 4,387,497 A | 6/1983 | Gulistan |
| D283,591 S | 4/1986 | Swanstrom |
| 4,903,851 A | 2/1990 | Slough |
| 5,031,789 A | 7/1991 | Dauberger |
| 5,223,674 A | 6/1993 | Reznikov |
| 5,340,258 A * | 8/1994 | Simon ........................... 411/535 |
| 5,507,398 A | 4/1996 | Miller |
| 5,963,432 A | 10/1999 | Crowley |
| D437,209 S | 2/2001 | McDonough et al. |
| 6,789,993 B2 * | 9/2004 | Ozawa et al. ................. 411/546 |
| D518,705 S | 4/2006 | Lin |
| 7,034,223 B2 | 4/2006 | Fan et al. |
| 7,540,699 B2 | 6/2009 | Selle |
| 7,607,854 B1 | 10/2009 | Goodson et al. |
| 8,034,111 B2 | 10/2011 | Hsu et al. |
| 8,152,117 B2 | 4/2012 | Gain |

FOREIGN PATENT DOCUMENTS

| | | |
|---|---|---|
| CA | 766082 A | 8/1967 |
| DE | 2457228 A1 | 6/1976 |
| WO | WO 2009/029911 A1 | 3/2009 |

* cited by examiner

*Primary Examiner* — Roberta Delisle
(74) *Attorney, Agent, or Firm* — Cameron IP

(57) ABSTRACT

The present invention relates to an adjustable spacer. The spacer includes an elongate member. The spacer includes a sleeve extendable around the elongate member. The elongate member is moveable relative to the sleeve. The sleeve has a locking member. The spacer includes an engaging member configured to selectively engage the locking member for inhibiting movement of the sleeve relative to the elongate member when a desired spacing of the elongate member relative to the sleeve is determined.

16 Claims, 5 Drawing Sheets

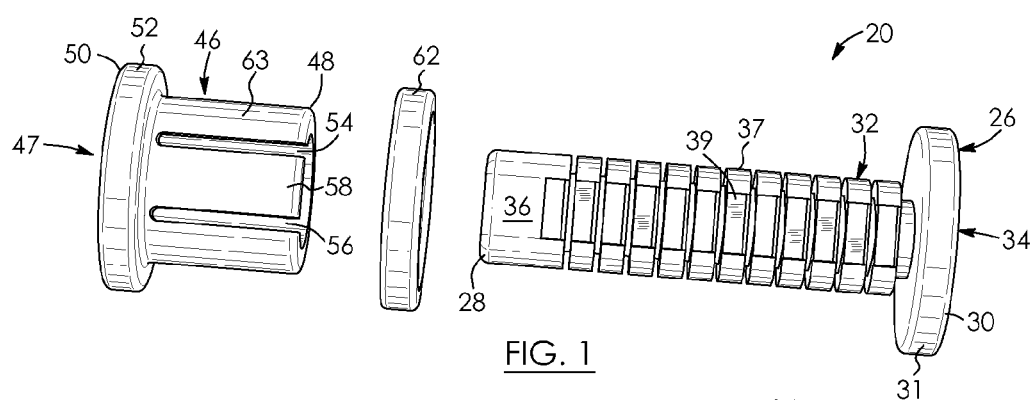
FIG. 1
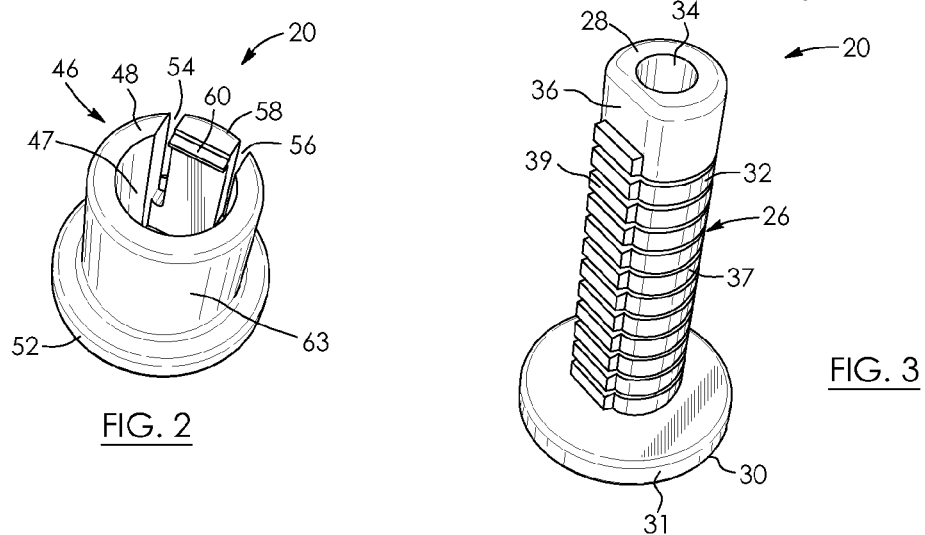
FIG. 2
FIG. 3

VARIABLE-LENGTH, ADJUSTABLE SPACER

FIELD OF THE INVENTION

There is provided an adjustable spacer. In particular, there is provided a variable-length, adjustable spacer for mounting a receptacle to a wall, ceiling or floor.

DESCRIPTION OF THE RELATED ART

In the gas appliance industry, the end of a gas pipe will typically extend outwards from the wall of a house. This pipe connects to a gas outlet box. In order to connect the outlet box to the wall of the house, typically a spacer or standoff is used.

Fixed-length standoffs are known per se and are sold in a series of specific spacer sizes. However, there may be variations in the extent to which the pipe extends from the wall of the house. This may require shimming of the fixed-length standoffs to properly mount the outlet box to the wall. Such a procedure may be a time consuming and may result in a relatively imprecise means for mounting.

Also, variations in the type of wall finish, such as siding, stucco finishes and other wall finishes, which may or not form a flat vertical plane, further complicate the mounting of gas outlet boxes to the wall.

PCT Publication No. WO/2009/029911 to Harris et al. discloses a variable length standoff assembly configured to mount one or more portions of one or more panels to a frame or support structure, regardless of curvature or angling in the given panel or frame. The variable length standoff assembly includes a connector bar to which one or more variable length standoffs can be attached. Each variable length standoff includes a standoff barrel and an adjustable extender to which a manufacturer can attach a portion of a given panel via a mounting cap. Each variable length standoff can be rotated about the connector bar, and can be extended or shortened to a wide range of lengths. In one implementation, a variable length standoff can also be configured to rotate with respect to the connector bar in at least two planes, thereby providing additional degrees of freedom for attaching variously curved and/or differentially orientated panels to a support structure.

U.S. Pat. No. 8,034,111 to Hsu et al. provides an adjustable vertebral spacer that includes a spacer body. A movable member is coupled to the spacer body. An adjustment ring is mounted on the spacer body and is rotatable to move the movable member and to further adjust the combined height of the spacer body and the movable member. A lock ring is mounted on the spacer body for locking the movable member to the adjustment ring. A top endplate is coupled to the movable member at the top and is tiltable to fit the angle of the adjacent upper vertebral body during surgery operation.

The above set out adjustable spacers may be relatively complicated to use, may require a relatively large number of parts and/or may be relatively costly to manufacture.

There is accordingly a need for an improved spacer or standoff that overcomes the above disadvantages.

BRIEF SUMMARY OF INVENTION

There is provided a variable-length, adjustable spacer disclosed herein that overcomes the above disadvantages. It is an object to provide an improved variable-length, adjustable spacer.

There is accordingly provided an adjustable spacer. The spacer includes an elongate member. The spacer includes a sleeve extendable around the elongate member. The elongate member is moveable relative to the sleeve. The sleeve has a locking member. The spacer includes an engaging member configured to selectively engage the locking member for inhibiting movement of the sleeve relative to the elongate member when a desired spacing of the elongate member relative to the sleeve is determined.

There is also provided an adjustable spacer for mounting a receptacle to a surface. The spacer includes an elongate member having a first end and a flanged second end spaced-apart from the first end. The elongate member has a plurality of axially spaced-apart protrusions positioned between the first and the second end. The elongate member has a plurality of axially spaced-apart grooves positioned between adjacent ones of the protrusions. The spacer includes a sleeve shaped to extend around the elongate member. The sleeve has a first end and a flanged second end spaced-apart from the first end. The sleeve has a pair of slots extending axially from the first end of the sleeve towards the second end of the sleeve. The sleeve has a resilient, locking member positioned between the slots. The spacer includes an engaging member shaped to extend around the sleeve. The spacer has an adjustment mode where the engaging member abuts the flanged second end of the sleeve and the engaging member slidably abuts with and over of the protrusions of the elongate member. When a distance of separation between the flanged second ends corresponding to a desired distance of separation between the receptacle and the surface is determined, the spacer has a locking mode where the engaging member aligns with the first end of the sleeve. This causes the engaging member to engage a respective one of the protrusions to inhibit further movement of the sleeve relative to the elongate member. The distance of separation between the flanged second ends of the sleeve and the elongate member is fixed in place thereby.

BRIEF DESCRIPTION OF DRAWINGS

The invention will be more readily understood from the following description of preferred embodiments thereof given, by way of example only, with reference to the accompanying drawings, in which:

FIG. 1 is a exploded, perspective view of an adjustable spacer, or standoff, according one aspect;

FIG. 2 is a perspective view of a sleeve for the standoff of FIG. 1;

FIG. 3 is a perspective view of an elongate member for the standoff of FIG. 1;

DESCRIPTION OF THE PREFERRED EMBODIMENTS

Figure 10:
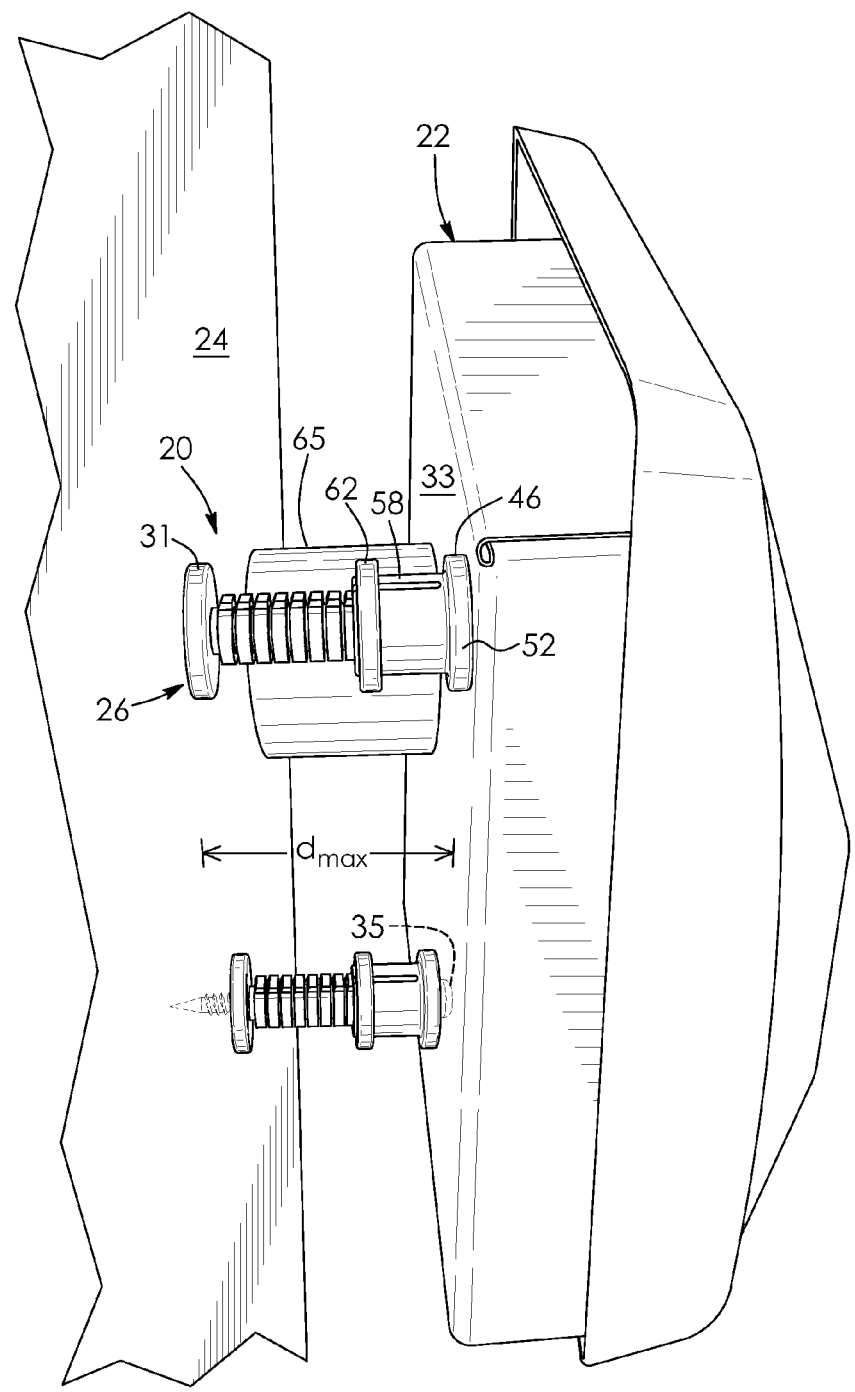
FIG. 10 is a side, rear perspective view of a wall showing a gas pipe, a gas outlet box connected to the gas pipe and a plurality of standoffs each in the locking mode, the standoffs being interposed between the wall and the gas outlet box.

Referring to the drawings and first to FIG. 1, there is shown a variable-length, adjustable spacer, in this example an adjustable standoff 20 for mounting a receptacle, in this example a gas outlet box 22 seen in FIG. 10, to a surface, in this example wall 24. The standoff may be used for mounting other receptacles or objects to a wall instead of the outlet box. Also, the surface need not be a wall 24: for example, it may be, in the alternative, a ceiling or a floor. The standoff 20 is made of a polymer, in this example, though this is not strictly required. Referring back to FIG. 1, the standoff includes an elongate member 26 that is generally cylindrical in shape. The elongate member has a first end 28 and a flanged second end 30 spaced-apart from the first end. The elongate member 26 has an enlarged portion, in this example a flange 31 at its second end. Second end 30 is thus enlarged relative to end 28 and may be referred to as an outer end. First end 28 may be referred to as an inner end. Flange 31 is configured to abut either wall 24, as seen in FIG. 10, or rear wall 33 of outlet box 22.

Figure 9:
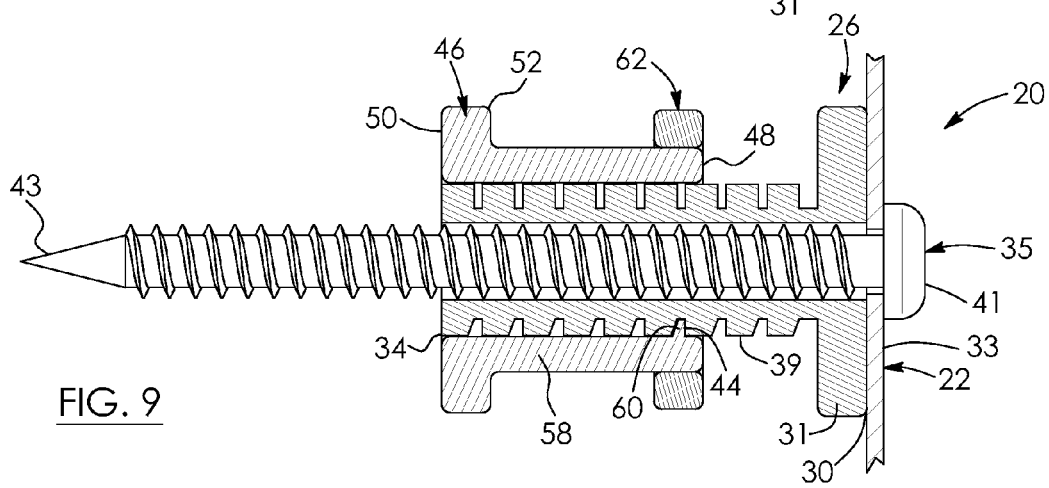
FIG. 9 is a cross-sectional view of the standoff of FIG. 8, with the excess portion of the elongate member cut-off, together with a fastener extending through the standoff.

As best seen in FIG. 3, the elongate member 26 includes a shaft 32 that is partially circular in section in this example and which extends from flange 31 to end 28. The elongate member has a central aperture 34 configured to receive a fastener therethrough, in this example a screw 35 as seen in FIG. 9, for fastening the outlet box 22 to the wall 24. The central aperture extends through flange 31 and shaft 32, from end 30 of the elongate member 26 to end 28 of the elongate member. The screw 35 shown in FIG. 9 has a screw head 41 and a pointed end 43. The screw head abuts rear wall 33 of outlet box 22 when the screw is fully screwed into the elongate member 26. Wall 33 is shown in fragment in FIG. 9 and abuts flange 31. Pointed end 43 of screw 35 extends outwards from the standoff 20, and is spaced-apart from sleeve 46 and elongate member 26. The elongate member also includes an axially extending, partially flattened side 36 in this example as best seen in FIG. 3. Side 36 is positioned between ends 28 and 30.

Figure 5:
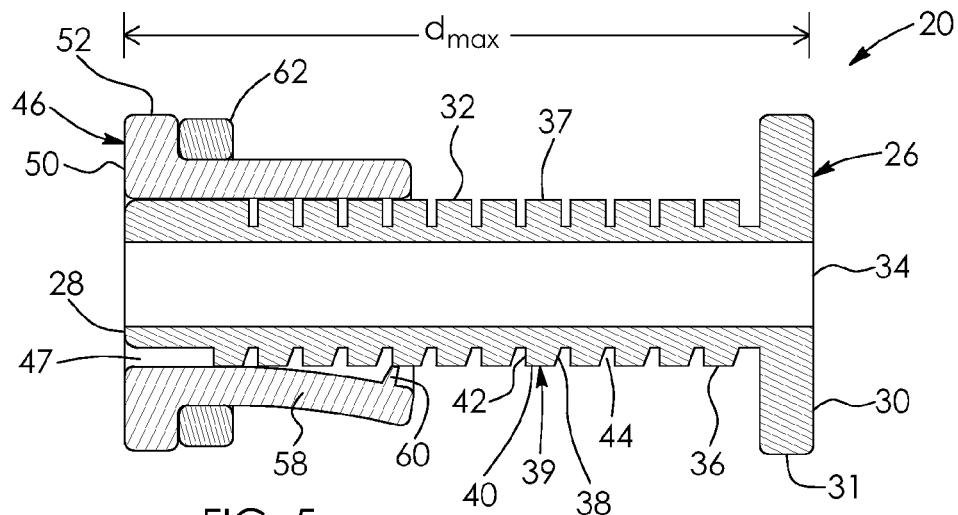
FIG. 5 is a cross-sectional view of the standoff of FIG. 4.
Figure 6:
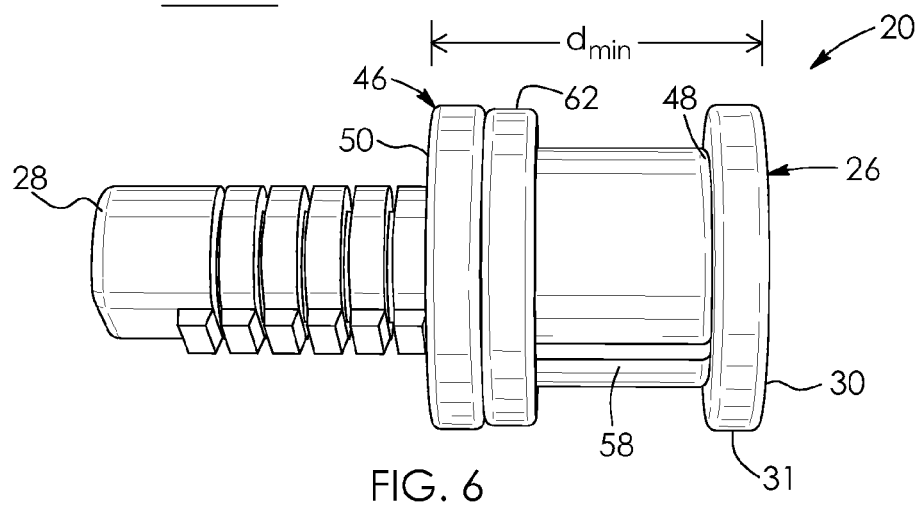
FIG. 6 is a perspective view of the standoff of FIG. 4 in the adjustment mode and a retracted position.
Figure 7:
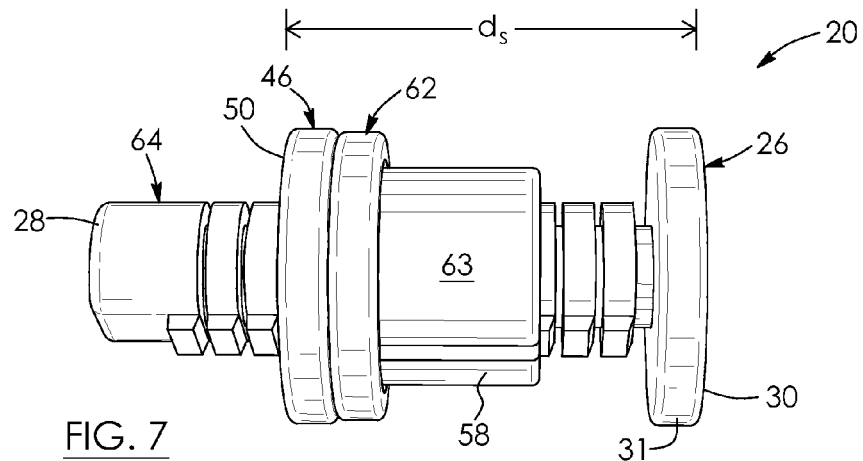
FIG. 7 is a perspective view of the standoff of FIG. 6 in the adjustment mode and an intermediate position.

Referring back to FIG. 1, the shaft 32 has a plurality of axially spaced-apart annular ribs, as shown by rib 37, positioned between the first end 28 and the second end 30. The ribs are separated by annular grooves 44. Each rib has a protrusion 39 extending radially outwards therefrom. The protrusions 39 are disposed in a row along the flattened side 36 of the elongate member 26 and are best seen in FIG. 5. Each protrusion 39 is in the shape of a right-angled trapezium in this example and has at least one radially extending bevelled face 38 facing flange 31 in this example. Each protrusion also has a flat distal end 40 radially spaced-apart from the rest of the shaft 32 and a radially extending face 42 spaced-apart from face 38. Faces 42 face end 28 of the elongate member 26. The elongate member has a plurality of axially spaced-apart grooves, as shown by groove 44 positioned between adjacent ones of the ribs 37. The grooves are positioned between respective ones of faces 38 and 42 in this example.

Referring back to FIG. 1, the standoff 20 includes a sleeve 46. The sleeve has a central bore 47 shaped to receive and be moveable along the elongate member 26. The sleeve has a first end 48, and a flanged second end 50 spaced-apart from the first end. Bore 47 extends from end 48 to end 50. The sleeve 46 has an enlarged portion, in this example flange 52 at its end 50. Flange 52 is configured to abut either rear wall 33 of outlet box 22, as seen in FIG. 10, or wall 24. The sleeve 46 is thus generally in the shape of a hollow cylinder with two opens ends. End 50 may be referred to as an outer end and is enlarged relative to end 48. End 48 may be referred to as an inner end. The sleeve 46 includes a pair of spaced-apart slots 54 and 56 axially extending from the first end 48 of the sleeve towards flange 52.

The sleeve includes a resilient, locking member, in this example a locking tab 58 that is a curved rectangular prism in section in this example. The locking tab 58 is positioned between the slots 54 and 56 and extends from end 48 to flange 52. The locking tab may be made of a polymer such as plastic in this example, though this is not strictly required. Slots 54 and 56 enable the locking tab 58 resiliently deflect radially inwards or outwards. As best seen in FIG. 2, the locking tab has an inner tooth 60. The tooth in this example is in the shape of an elongated strip which radially extends towards the elongate member 26, as best seen in FIGS. 5 and 9.

The tooth 60 is configured to selectively abut with and be disposed between adjacent ones of the protrusions 39 of the elongate member 26. This fixes the position of the sleeve along the elongate member, fixing the distance of separation between the ends 50 and 30 of the sleeve 46 and the elongate member 26.

The standoff 20 has an adjustment mode, as seen in FIGS. 4 to 7, where the locking tab 58 of the sleeve 46 is adjacent to and is moveable along portions of the elongate member 26, such as face 38, end 40 and face 42, adjacent to the grooves 44, as best seen in FIG. 5. The standoff so configured enables the tooth 60 to slidably move against, abut with and slidably move over the tops of the protrusions 39 for adjusting the distance of separation $d_s$, seen in FIG. 7, between the flanges 31 and 52 of the elongate member 26 and the sleeve 46, respectively. Bevelled faces 38, seen in FIG. 5, promote this sliding action. The sleeve 46 is moveable from an extended position with a maximum distance of separation $d_{max}$ shown in FIGS. 4 and 5 where flange 52 of the sleeve aligns with end 28 of the elongate member 26, to a retracted position with a minimum distance of separation $d_{min}$ shown in FIG. 6 where end 48 of sleeve 46 abuts with flange 31 of the elongate member.

Figure 4:
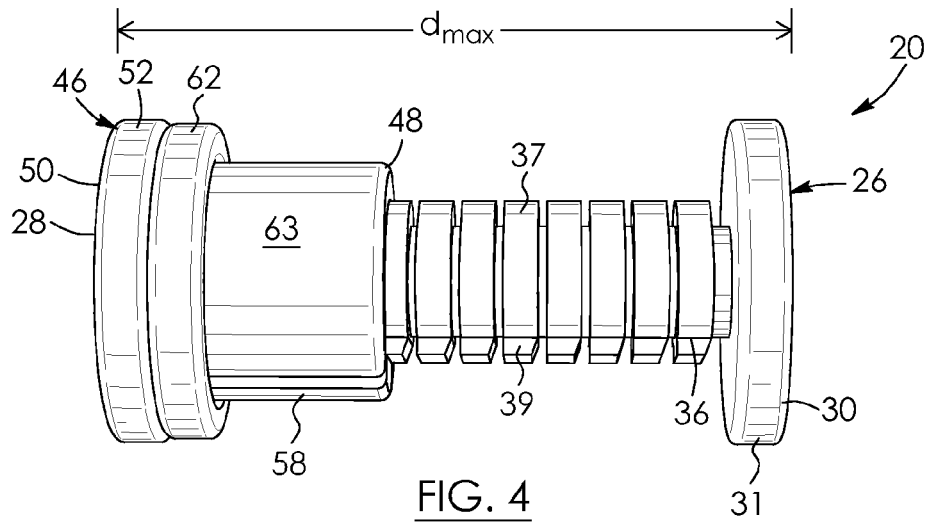
FIG. 4 is an assembled perspective view of the standoff of FIG. 1 in an adjustment mode and an extended position.

Referring to FIG. 1, the standoff 20 further includes an engaging member, that is annular in this example, in the form in this example of a locking ring 62 configured to selectively engage the locking tab 58. The locking ring is shaped to extend around the circular outer wall 63 of the sleeve 46, as seen in FIG. 4. The locking ring 62 is disposed between ends 30 and 50 of the elongate member 26 and the sleeve 46, respectively. In the adjustment mode shown in FIGS. 4 to 7, the locking ring 62 abuts flange 52 of sleeve 46 in this example.

Figure 8:
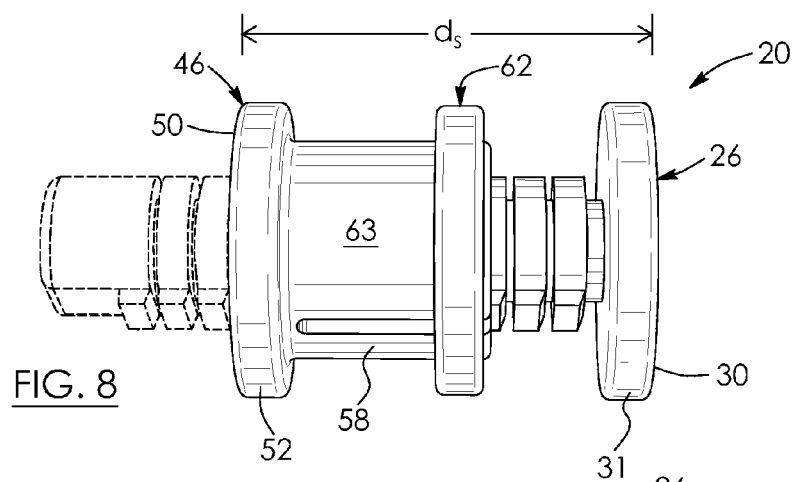
FIG. 8 is a perspective view of the standoff of FIG. 7 with an excess portion of the elongate member removed and with an engaging member of the standoff positioned so that the standoff is a locking mode.

Referring to FIG. 10, gas pipe 65 extends outwards from wall 24 and connects to gas outlet box 22. The box so connected to the pipe determines a desired distance of separation $d_{des}$ between the rear wall 33 of the outlet box 22 and the wall 24 Referring to FIGS. 7 and 10, when a distance of separation $d_s$ between flanges 52 and 31 corresponding to the desired distance of separation $d_{des}$ between the rear wall 33 of the outlet box 22 and the wall 24 is determined, the elongate member 26 at this stage has an excess shaft portion 64 extending between end 50 of sleeve 46 and end 28 of the elongate member 26. The excess shaft portion is to be removed, by way of a clipper or saw (not shown) for example. The excess shaft portion is shown removed in FIGS. 8 and 9. In FIG. 8, the removed shaft portion 64 is shown in dotted lines. With the excess shaft portion so removed, the standoff 20 is buttressed by the two spaced-apart end flanges 52 and 31. Thus, once the standoff 20 has been adjusted to the desired length such as that shown in FIGS. 8 and 9, the end bit or excess shaft portion 64 of the elongate member extending past the sleeve is cut-off or trimmed.

The standoff 20 may next be positioned in a locking mode as seen in FIGS. 8 to 10. In the locking mode, the locking ring 62 is slidable along outer wall 63 of sleeve 46 so as to align with tooth 60, as best seen in FIG. 9. In this example, the locking ring so positioned also aligns with end 48 of sleeve 46. The locking ring 62 in this mode actuates the locking tab 58 inwards towards the elongate member 26, causing the tooth 60 to engage with a respective one of the grooves 44, as best seen in FIG. 9. Thus, in the locking mode, the locking ring 62 positions tooth 60 within a selective one of the grooves 44 for fixing the sleeve in place. The locking ring 62 inhibits radially outwards movement of the locking tab 58, which thus inhibits tooth 60 from dislodging from groove 44. This thereby inhibits further movement of the sleeve 46 relative to the elongate member 26. The tooth 60 and locking ring 62 so positioned fix in place the distance of separation $d_s$, shown in FIG. 7, between flanges 52 and 31 of the sleeve 46 and elongate member 26. The standoff so configured is thus at the optimal distance for mounting the outlet box 22, seen in FIG. 10, to wall 24, via screws 35, one of which is illustrated by way of example in ghost in FIG. 10.

Figure 11:
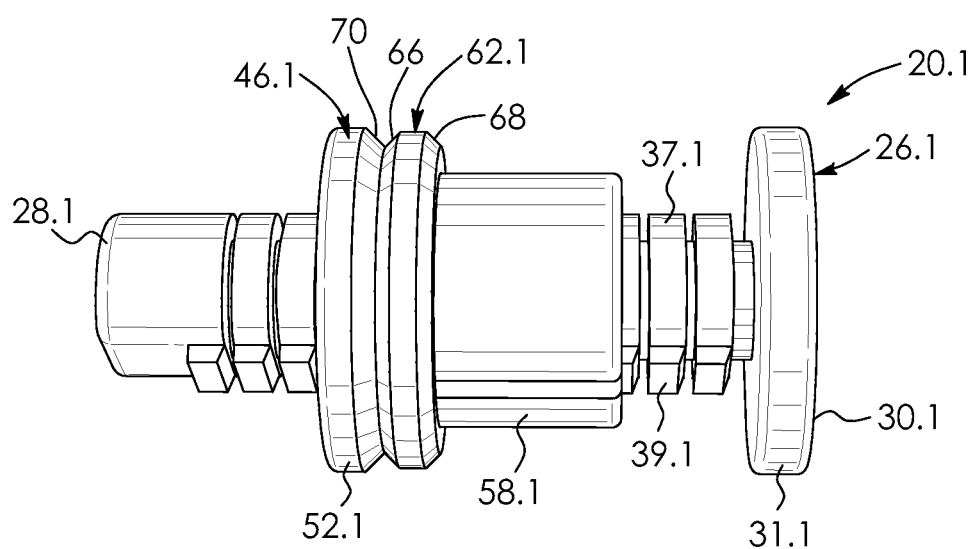
FIG. 11 is a perspective view of a standoff according to a further aspect.

FIG. 11 shows an adjustable standoff 20.1 according to another aspect. Like parts have like numbers and functions as the embodiment shown in FIGS. 1 to 10 with the addition of "0.1". Standoff 20.1 is substantially the same as standoff 20 shown in FIGS. 1 to 10 with the following exceptions.

Locking ring 62.1 has a pair of spaced-apart bevelled edges 66 and 68. Sleeve 46.1 has a bevelled edge 70 of its flange 46.1 which at least partially faces the locking ring and which is opposite edge 66. The bevelled edges are configured to better enable a user's fingers to be positioned between the locking ring 62.1 and flange 52.1. Thus, the bevelled edges 66, 68 and 70 may facilitate manual movement of locking ring 62.1 from the adjustment mode shown in FIG. 11 where the ring and flange 52.1 abut, to the locking mode shown in FIG. 8 for example for standoff 20.

It will be appreciated that many variations are possible within the scope of the invention described herein. For example, instead of engaging protrusions 39, tooth 60 may engage ribs 37. Also, instead of a tooth 60, grooves 44 and protrusions 39, the sleeve may engage with the elongate member 26 by way of a friction fit.

An edge of the flange 31.1 of the elongate member 26.1 facing the locking ring 62.1 may also be bevelled for further facilitating manual movement of the locking ring.

It will be understood by someone skilled in the art that many of the details provided above are by way of example only and are not intended to limit the scope of the invention which is to be determined with reference to at least the following claims.

What is claimed is:

1. An adjustable spacer for spacing a receptacle from a surface by a desired distance, comprising:
   an elongate member having a central aperture configured to receive a fastener therethrough, and axially spaced-apart protrusions;
   a sleeve, having a pair of spaced-apart axially extending slots, the sleeve being extendable around the elongate member, the elongate member being moveable relative to the sleeve and the sleeve having a resilient locking member having a tooth is positioned between the slots, the tooth of the locking member selectively abutting with and being disposed between adjacent ones of the protrusions in a lock mode; and
   an engaging member configured to selectively engage the locking member for inhibiting movement of the sleeve relative to the elongate member when a desired spacing of the elongate member relative to the sleeve is determined.

2. The spacer as claimed in claim 1, wherein the elongate member and the sleeve each have outer enlarged portions for abutting respective spaced-apart surfaces when the desired spacing is determined.

3. The spacer as claimed in claim 2, wherein the engaging member is disposed between the outer enlarged portions of the elongate member and the sleeve.

4. The spacer as claimed in claim 2, wherein the engaging member is bevelled and wherein a side of the enlarged portion of the sleeve facing the engaging member is bevelled.

5. The spacer as claimed in claim 4, wherein a side of the enlarged portion of the elongate member facing the engaging member is bevelled.

6. The spacer as claimed in claim 1, wherein the elongate member has a plurality of axially spaced-apart grooves, wherein the spacer has an adjustment mode where the locking member of the sleeve is adjacent to and moveable along portions of the elongate member adjacent to the grooves and wherein the spacer has a locking mode where the engaging member positions the locking member within a selective one of the grooves for fixing the sleeve in place.

7. The spacer as claimed in claim 6, wherein the sleeve has an outer end, the elongate member has an outer end spaced-apart from the outer end of the sleeve, an inner end spaced-apart from the outer end and an excess portion positioned between the outer end of the sleeve and the inner end of the elongate member, the excess portion of the elongate member being removable upon the desired spacing being determined.

8. The spacer as claimed in claim 1, wherein the engaging member at least partially extends around the sleeve.

9. The spacer as claimed in claim 1, wherein each of the protrusions has at least one beveled face to enable the tooth to slidably move against and over of the protrusions for adjusting the elongate member relative to the sleeve prior to the locking mode.

10. The spacer as claimed in claim 1 wherein the elongate member includes a circular shaft with an axially extending partially flattened side upon which the locking member selectively engages.

11. The spacer as claimed in claim 1, wherein the sleeve has an outer end, a flange at the outer end and an inner end spaced-apart from the outer end, wherein the engaging member abuts the flange after moving the elongate member relative to the sleeve and wherein the engaging member aligns with the inner end of the sleeve when engaging the locking member for inhibiting movement of the sleeve relative to the elongate member.

12. The spacer as claimed in claim 11, wherein the sleeve has a pair of spaced-apart, axially extending slots extending from the inner end of the sleeve towards the outer end of the sleeve, the locking member being resilient and being positioned between the slots.

13. The spacer as claimed in claim 1, wherein the engaging member is annular.

14. An adjustable spacer for mounting a receptacle to a surface, the spacer comprising:
   an elongate member having a first end, a flanged second end spaced-apart from the first end, a plurality of axially spaced-apart protrusions positioned between the first and the second end, and a plurality of axially spaced-apart grooves positioned between adjacent ones of the protrusions;
   a sleeve shaped to extend around the elongate member, the sleeve having a first end, a flanged second end spaced-apart from the first end, a pair of slots extending axially from the first end of the sleeve towards the second end of the sleeve, and a resilient, locking member positioned between the slots; and an engaging member shaped to extend around the sleeve, the spacer having an adjustment mode wherein the engaging member abuts the flanged second end of the sleeve and the engaging member slidably abuts with and over of the protrusions of the elongate member, and when a distance of separation between the flanged second ends corresponding to a desired distance of separation between the receptacle and the surface is determined, the spacer having a locking mode wherein the engaging member aligns with the first end of the sleeve, causing the engaging member to engage a respective one of the protrusions to inhibit further movement of the sleeve relative to the elongate member, thereby fixing in place the distance of separation between the flanged second ends of the sleeve and the elongate member.

15. The spacer as claimed in claim 14, wherein the locking member has a tooth extending towards the elongate member, the tooth aligning with the first end of the sleeve, the tooth slidably abutting with and over of the protrusions of the elongate member in the adjustment mode and engaging said respective one of the grooves in the locking mode.

16. An adjustable spacer comprising:

an elongate member;

a sleeve extendable around the elongate member, the elongate member being moveable relative to the sleeve and the sleeve having a resilient locking member integrally formed with the sleeve, the locking member comprising a tooth shaped to radially deflect inwards; and an engaging member configured to selectively engage the locking member, causing the tooth to abut the elongated member thereby, for inhibiting movement of the sleeve relative to the elongate member when a desired spacing of the elongate member relative to the sleeve is determined.

* * * * *

UNITED STATES PATENT AND TRADEMARK OFFICE
CERTIFICATE OF CORRECTION

PATENT NO. : 8,651,788 B1
APPLICATION NO. : 13/605473
DATED : February 18, 2014
INVENTOR(S) : Horst Budde Page 1 of 1

It is certified that error appears in the above-identified patent and that said Letters Patent is hereby corrected as shown below:

In the Claims:

Col. 5, line 53, should read:

1. An adjustable spacer for spacing a receptacle from a surface by a desired distance, comprising: an elongate member having a central aperture configured to receive a fastener therethrough, and axially spaced-apart protrusions; a sleeve, having a pair of spaced-apart axially extending slots, the sleeve being extendable around the elongate member, the elongate member being moveable relative to the sleeve and the sleeve having a resilient locking member having a tooth positioned between the slots, the tooth of the locking member selectively abutting with and being disposed between adjacent ones of the protrusions in a lock mode; and an engaging member configured to selectively engage the locking member for inhibiting movement of the sleeve relative to the elongate member when a desired spacing of the elongate member relative to the sleeve is determined.

Signed and Sealed this
Seventeenth Day of June, 2014

Michelle K. Lee
*Deputy Director of the United States Patent and Trademark Office*